United States Patent [19]

Kuhlman et al.

[11] Patent Number: 5,316,365
[45] Date of Patent: May 31, 1994

[54] SLIDING DOOR CLOSED LOOP CABLE CLOSURE SYSTEM WITH BALANCED CABLE TENSION AND VARYING DIAMETER PULLEYS

[75] Inventors: Howard W. Kuhlman, Rochester Hills; Jeffrey K. Joyner, Ann Arbor, both of Mich.

[73] Assignee: General Motors Corporation, Detroit, Mich.

[21] Appl. No.: 8,817

[22] Filed: Jan. 25, 1993

[51] Int. Cl.⁵ ............................................. B60J 5/00
[52] U.S. Cl. ................................. 296/155; 49/216; 49/360
[58] Field of Search ............. 296/155, 146 A; 49/216, 49/360

[56] References Cited

U.S. PATENT DOCUMENTS

| | | | |
|---|---|---|---|
| 3,051,999 | 9/1962 | Schimek | 49/216 |
| 4,640,050 | 2/1987 | Yamagishi et al. | 49/360 |
| 4,644,692 | 2/1987 | Schindehutte | 49/360 X |
| 4,932,715 | 6/1990 | Kramer | 296/155 |
| 4,945,677 | 8/1990 | Kramer | 296/155 X |
| 5,046,283 | 9/1991 | Compeau et al. | 49/138 |
| 5,140,316 | 8/1992 | Deland et al. | 296/155 X |

*Primary Examiner*—Joseph D. Pape
*Attorney, Agent, or Firm*—Charles E. Leahy

[57] ABSTRACT

The van (10) has a sliding door (14) mounted on rollers (22, 24 and 30) that are supported by and slidable in tracks (16, 18 and 20). An opening and closing module (50) is mounted inside the van adjacent to the center track (18). A front cable (74) is attached to the front cable drive pulley (144), and extends from the pulley through a front cable roller guide assembly (54) and is attached to the hinge and roller assembly (26). A rear cable (100) is attached to the rear cable drive pulley (136) and extends from the pulley through a rear cable roller guide assembly (56) and is attached to the hinge and roller assembly (26). The front and rear cable drive pulleys (136 and 144) each have a large diameter spiral cable groove (164), a small diameter cable groove (208) and a transition cable groove 210. A motor (126) rotates the front and rear cable drive pulleys to move the sliding door. The small diameter cable grooves (208) drive the sliding door (14) when the door is in the forward portion of the tracks. The large diameter spiral cable grooves (164) drive the sliding door when the door is in the center and rear portions of the tracks. Fixed idler rollers (226 and 254) guide the front and rear cables (74 and 100) to and from the cable drive pulleys (136 and 144).

3 Claims, 12 Drawing Sheets

5,316,365

SLIDING DOOR CLOSED LOOP CABLE CLOSURE SYSTEM WITH BALANCED CABLE TENSION AND VARYING DIAMETER PULLEYS

TECHNICAL FIELD

The invention is in a motorized cable system for opening and closing a sliding door on a vehicle from a remote location and more particularly in a system for balancing cable length in a closed loop cable drive when pulleys with different diameters drive the closed loop cable and move the sliding door.

BACKGROUND OF THE INVENTION

Van type vehicles for passengers and for cargo are frequently equipped with a sliding side door. Sliding doors are supported and guided by rollers that run in fixed tracks. These sliding doors are generally on the side of the vehicle opposite the vehicle operator's station. To open or close the sliding doors, it is necessary for the vehicle operator to leave the operator's station and either walk around the outside of the vehicle to the sliding door or to cross the inside of the vehicle to the sliding door. Crossing the inside of the vehicle is often difficult or impossible due to cargo or passengers inside the van.

Power systems for opening and closing sliding doors on vehicles have long been considered desirable. Attempts to provide a power system for opening and closing sliding doors have had limited success. The systems have generally been complicated and expensive. Some of these sliding door opening and closing systems have not permitted manual opening or closing of sliding doors when the power system is inoperable for some reason. Other systems have not controlled the position of the door at all times thereby allowing some undesirable free travel.

Sliding door slamming and time requirements for opening and closing have also been problems. Sliding doors which move rapidly must be stopped quickly upon closing. This rapid deceleration places large loads on vehicle structures and causes noise. Acceleration forces that occur when sliding doors are accelerated from stationary states to relative high speeds also exert substantial loads on vehicle body structures that may lead to structural problems. Sliding doors which close gently have tended to move slowly and take excessive time to open and close.

SUMMARY OF THE INVENTION

An object of the invention is to provide a closed loop cable drive system for opening and closing a sliding door that maintains substantially the same cable tension in the closed cable loop during sliding door opening and sliding door closing.

Another object of the invention is to provide a closed loop cable drive system for opening and closing a sliding door with variable diameter cable drive pulleys that maintain substantially the same cable tension in the closed loop cable during sliding door opening and sliding door closing.

The sliding door is mounted on rollers in an upper track, a center track and a lower track. All three tracks are fixed to the vehicle body and frame. The forward ends of the tracks are curved inwardly toward the center of the vehicle to move the sliding door horizontally inward to compress a seal and to latch in a closed position.

The opening and closing system includes an effectively continuous cable loop that is attached to the sliding door and is driven in one direction to open the sliding door and is driven in the other direction to close the sliding door. A pair of cable drive pulleys are mounted on a common axis and are driven together by a motor in one direction or the other. The effectively continuous cable loop is attached to and driven by the cable drive pulleys to open the sliding door when the cable drive pulleys are driven in one direction and to close the sliding door when the cable drive pulleys are driven in another direction.

The cable drive pulleys take cable out of one side of the continuous cable loop and feed cable into the other side of the continuous cable loop when the cable drive pulleys are rotated. The portion of the continuous cable loop which looses cable to the cable drive pulleys depends upon the direction of rotation of the cable drive pulleys. The continuous cable loop remains substantially the same length by wrapping cable on one of the cable drive pulleys at the same rate as the cable is unwrapped from the other cable drive pulley.

Each cable drive pulley has a large diameter cable groove for high speed cable and sliding door movement and a small diameter cable groove for low speed cable and sliding door movement. The small diameter cable grooves on the cable drive pulleys drive the continuous cable loop and drive the sliding door during door latching to eliminate slamming and to provide increased force for seal compression and door latching. The small diameter cable grooves in the cable drive pulleys also drive the continuous cable loop following unlatching of the sliding door and during initial acceleration of the sliding door during door opening.

The front cable section extends from the front cable drive pulley to a cable spring tension and fixed idler roller system to a front cable roller guide assembly and to a hinge and roller assembly attached to the sliding door. The rear cable section extends from the rear cable drive pulley to a cable spring tension and fixed idler roller system, to a rear cable roller guide assembly and to the hinge and roller assembly attached to the sliding door. The spring tension and fixed idler roller system for the front cable section includes a fixed idler roller that is spaced from and in a fixed predetermined position relative to the front cable drive pulley. A spring biased roller is slidably mounted between the fixed idler roller and the front cable drive pulley. A spring biases the spring biased roller into contact with the front cable section. The spring biased roller increases tension in the front cable section and tends to wrap cable on the front cable drive pulley and to increase the amount of cable taken up in the front cable tensioner assembly. The spring tension and fixed idler roller system for the rear cable section includes a fixed idler roller that is spaced from and in a fixed predetermined position relative to the rear cable drive pulley. A spring biased roller is slidably mounted between the fixed idler roller and the rear cable drive pulley. A spring biases the spring biased roller in contact with the rear cable section. The spring biased roller increases tension in the rear cable section and tends to wrap cable on the rear cable drive pulley and to increase the amount of cable taken up in the rear cable tensioner assembly.

The spring tension and fixed idler roller system for both the front cable section and the rear cable section are positioned in positions relative to the front and rear cable drive pulleys which balance the tension in the cable sections. The front and rear cable sections are balanced when the tension in the continuous cable loop is the same when the front and rear cable sections are driven by the small diameter cable grooves on the front and rear cable drive pulleys as the tension in the front and rear cable sections when the front and rear cable sections are driven by the large diameter cable grooves on the front and rear cable drive pulleys.

The foregoing and other objects, features and advantages of the present invention will become apparent in the light of the following detailed description of an exemplary embodiment thereof, as illustrated in the accompanying drawings.

DESCRIPTION OF THE PREFERRED EMBODIMENT

Figure 1:
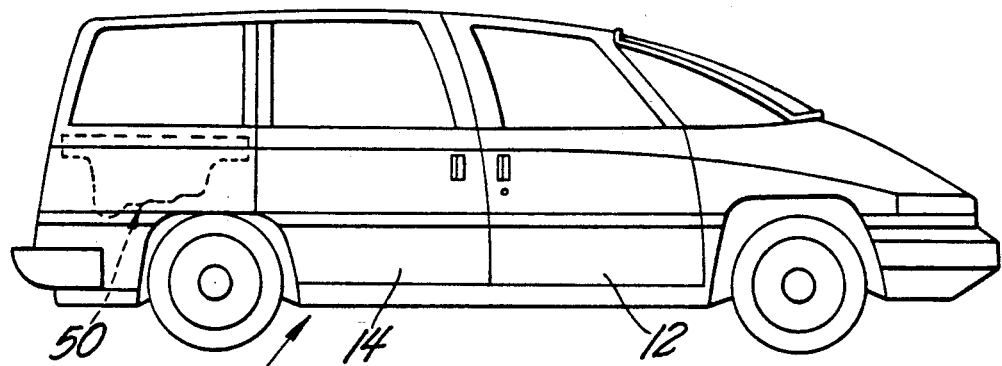
FIG. 1 is a view of the left side of a passenger van with a power sliding door.
Figure 2:
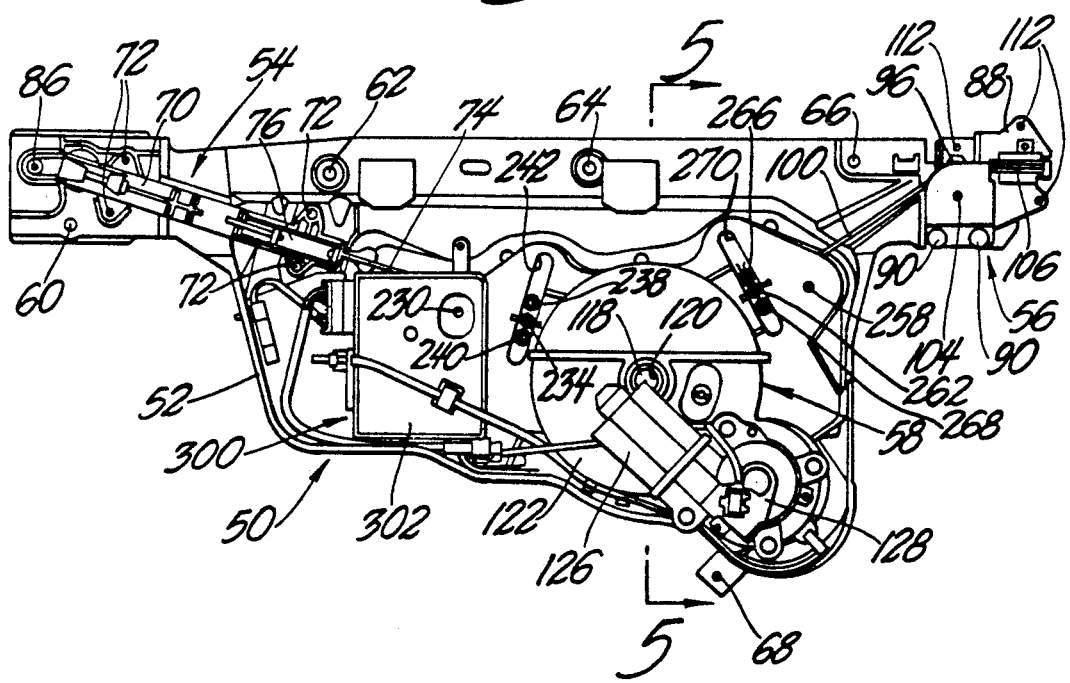
FIG. 2 is an elevational view of the power sliding door opening and closing module as seen from the inside of the van with the interior cover removed.
Figure 3:
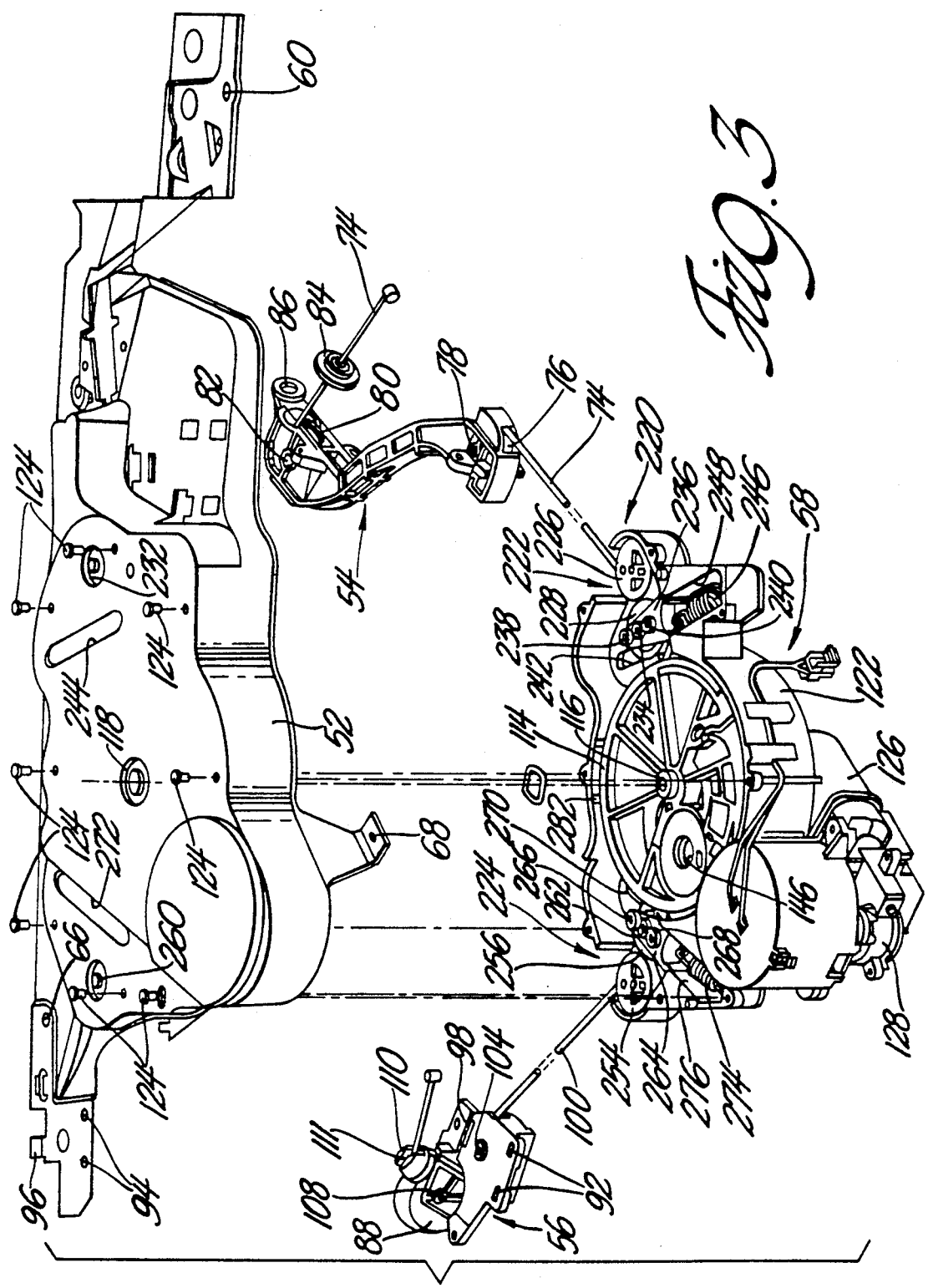
FIG. 3 is a partially exploded view of the power sliding door opening and closing module.
Figure 4:
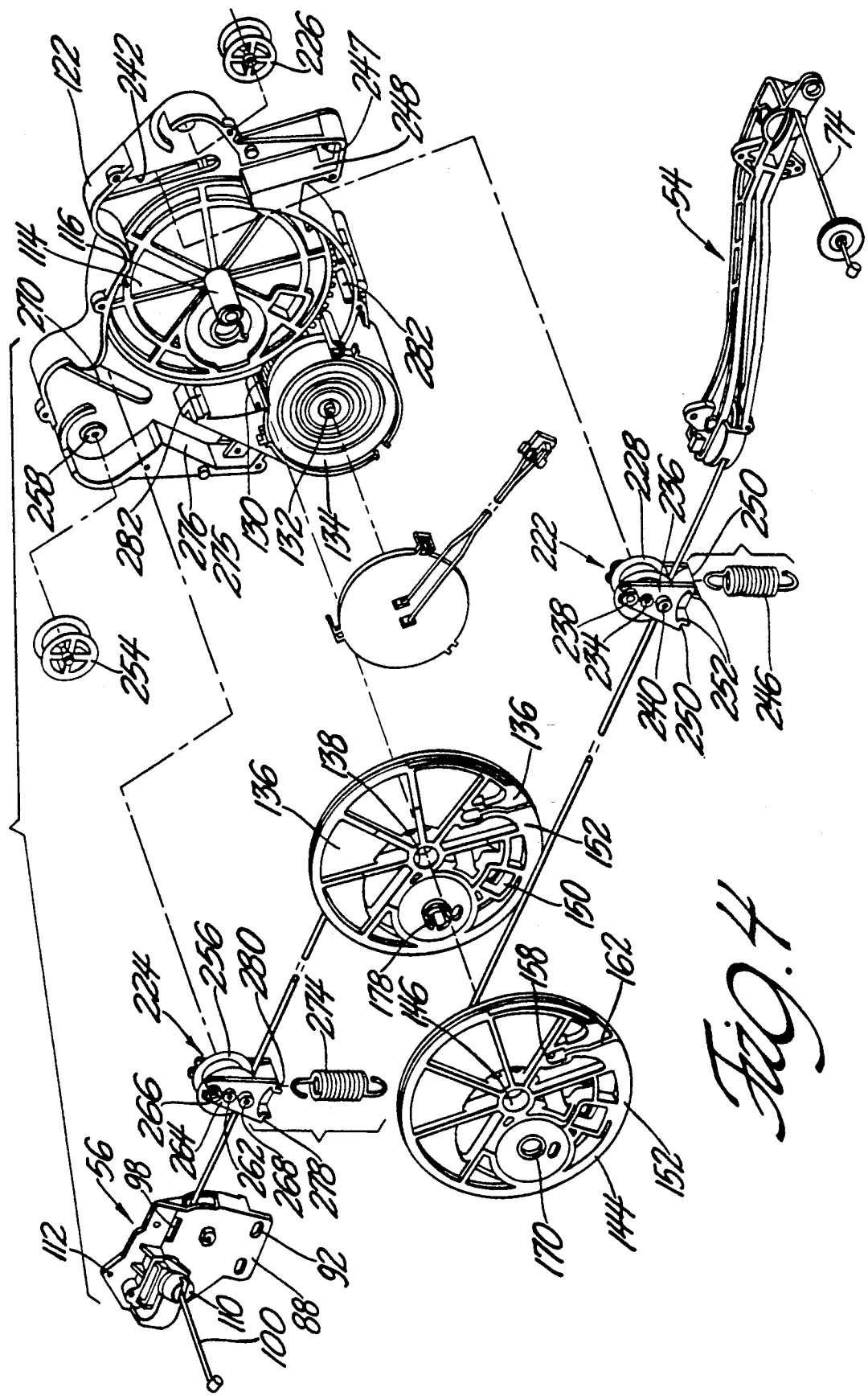
FIG. 4 is an exploded view of the power sliding door opening and closing cable drive assembly.
Figure 5:
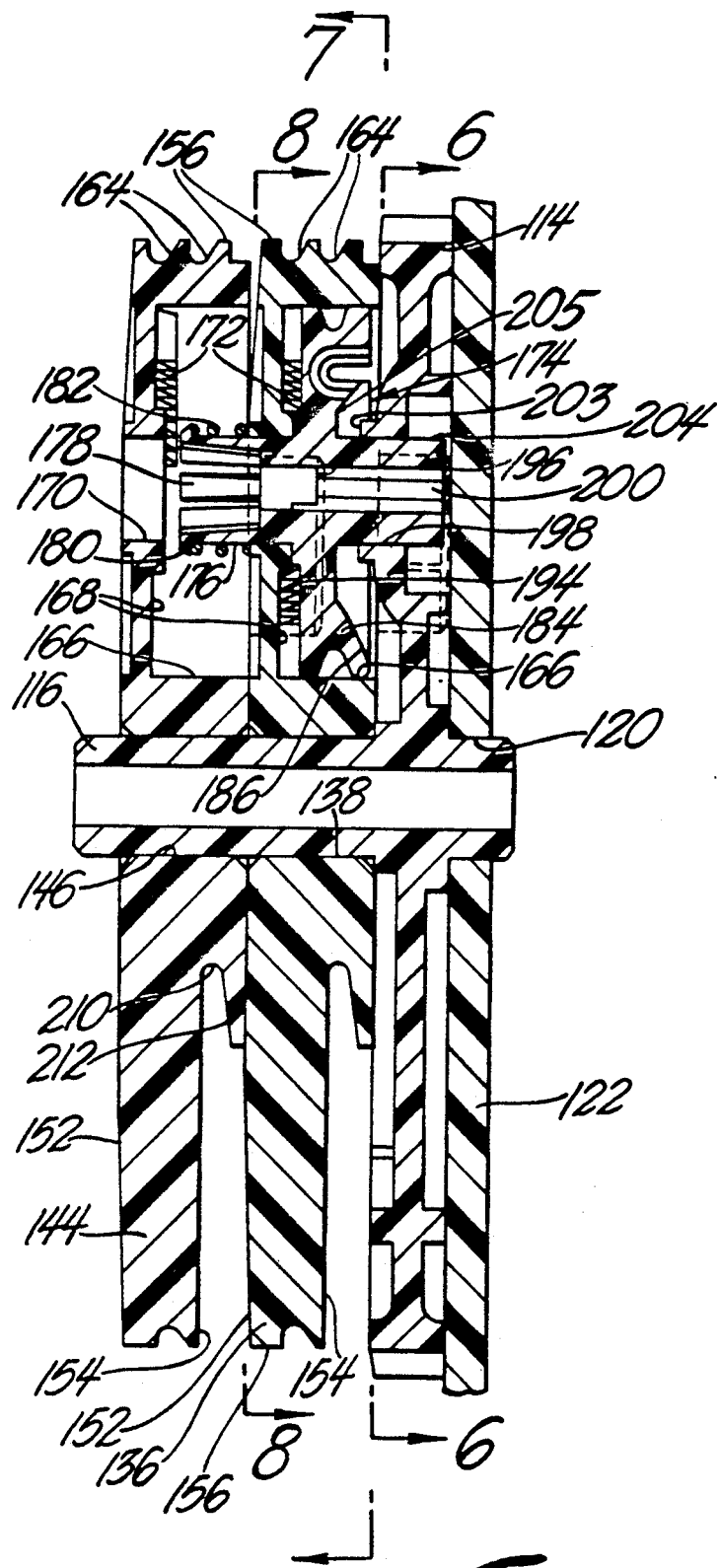
FIG. 5 is an enlarged sectional view of the cable drive pulleys and the cable drive pulley driven gear.
Figure 6:
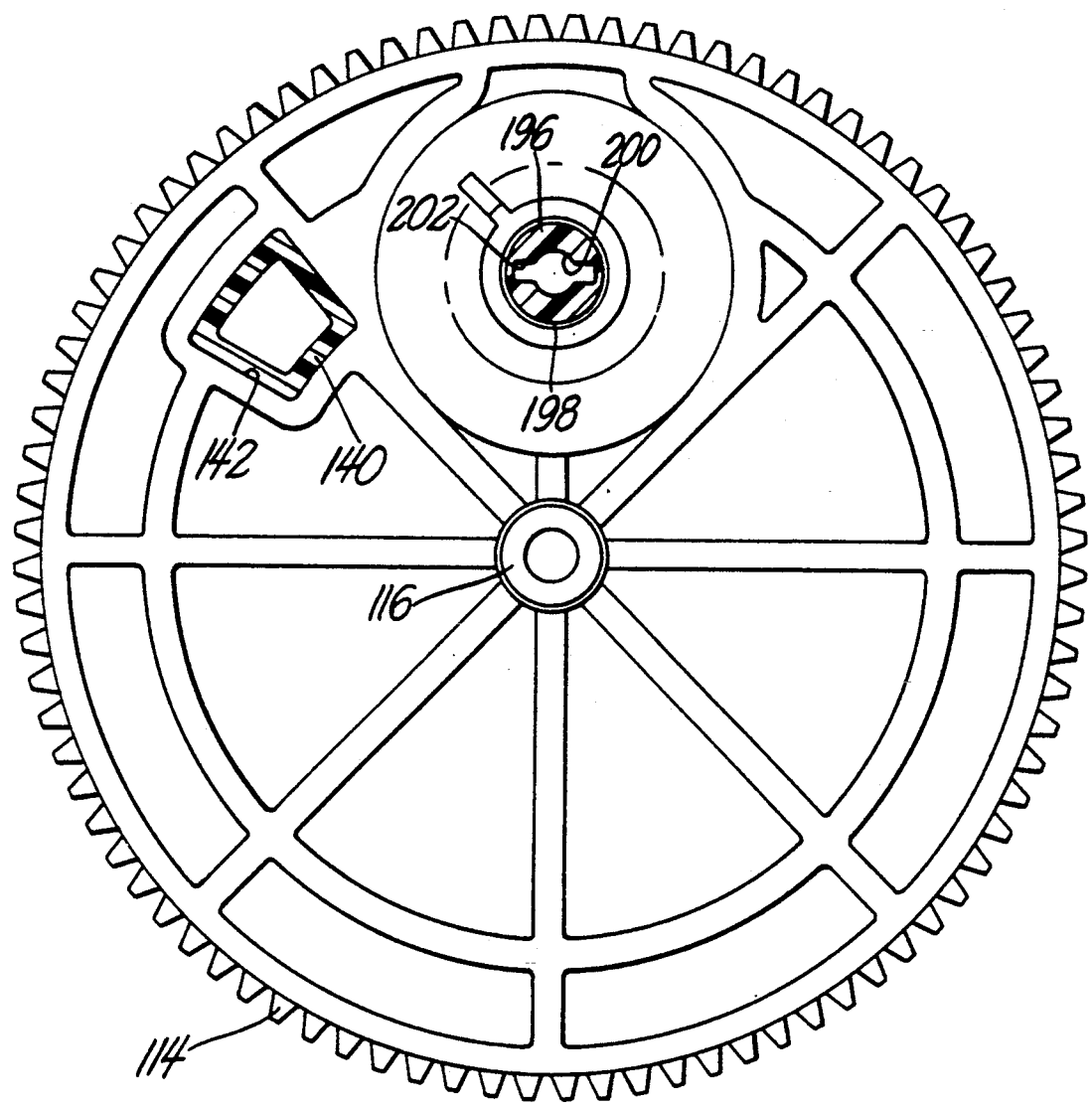
FIG. 6 is a sectional view of the cable drive pulley driven gear taken along line 6—6 in FIG. 5.
Figure 7:
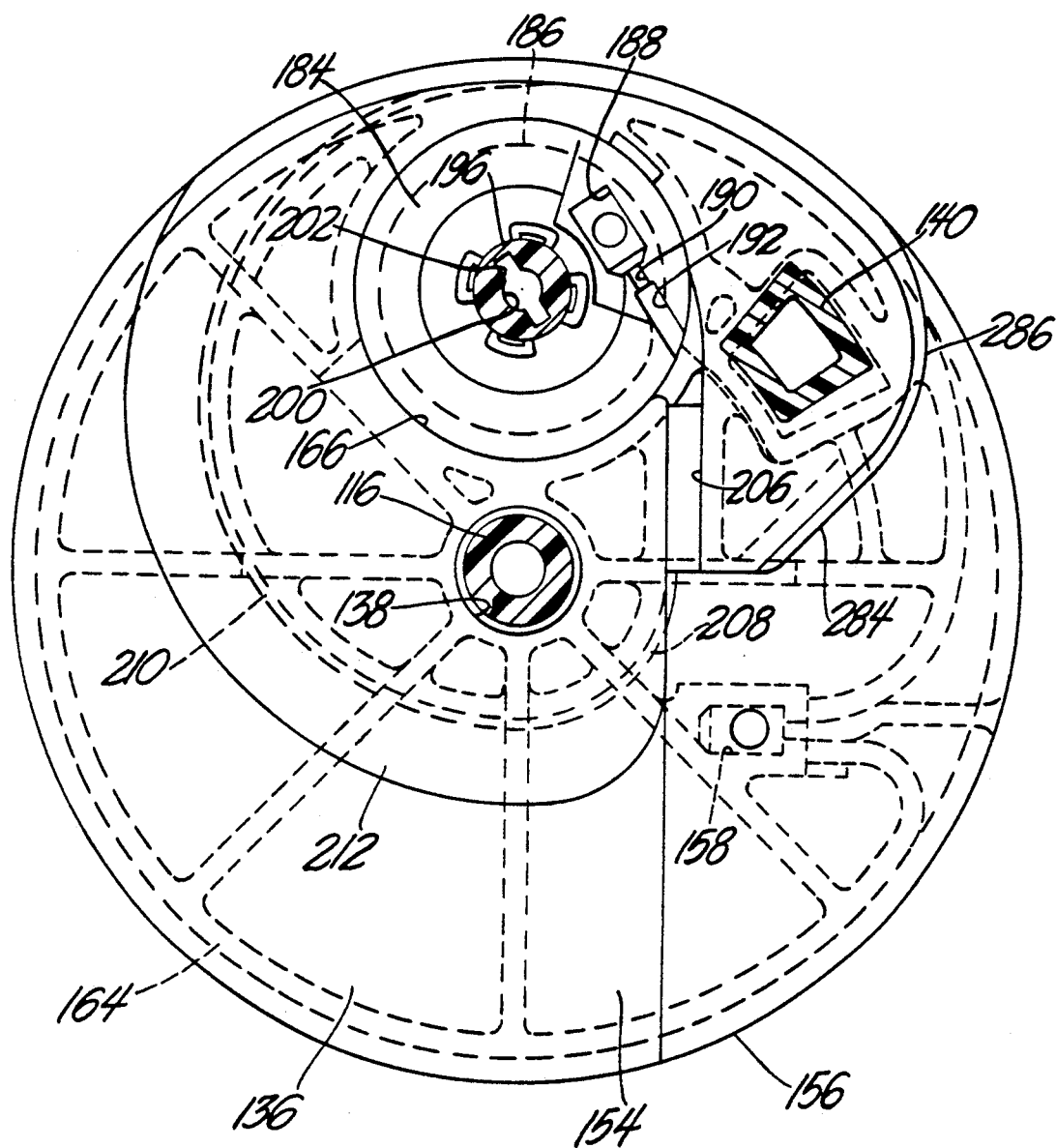
FIG. 7 is a sectional view of the cable drive pulley for the rear drive cable taken along line 7—7 in FIG. 5.
Figure 8:
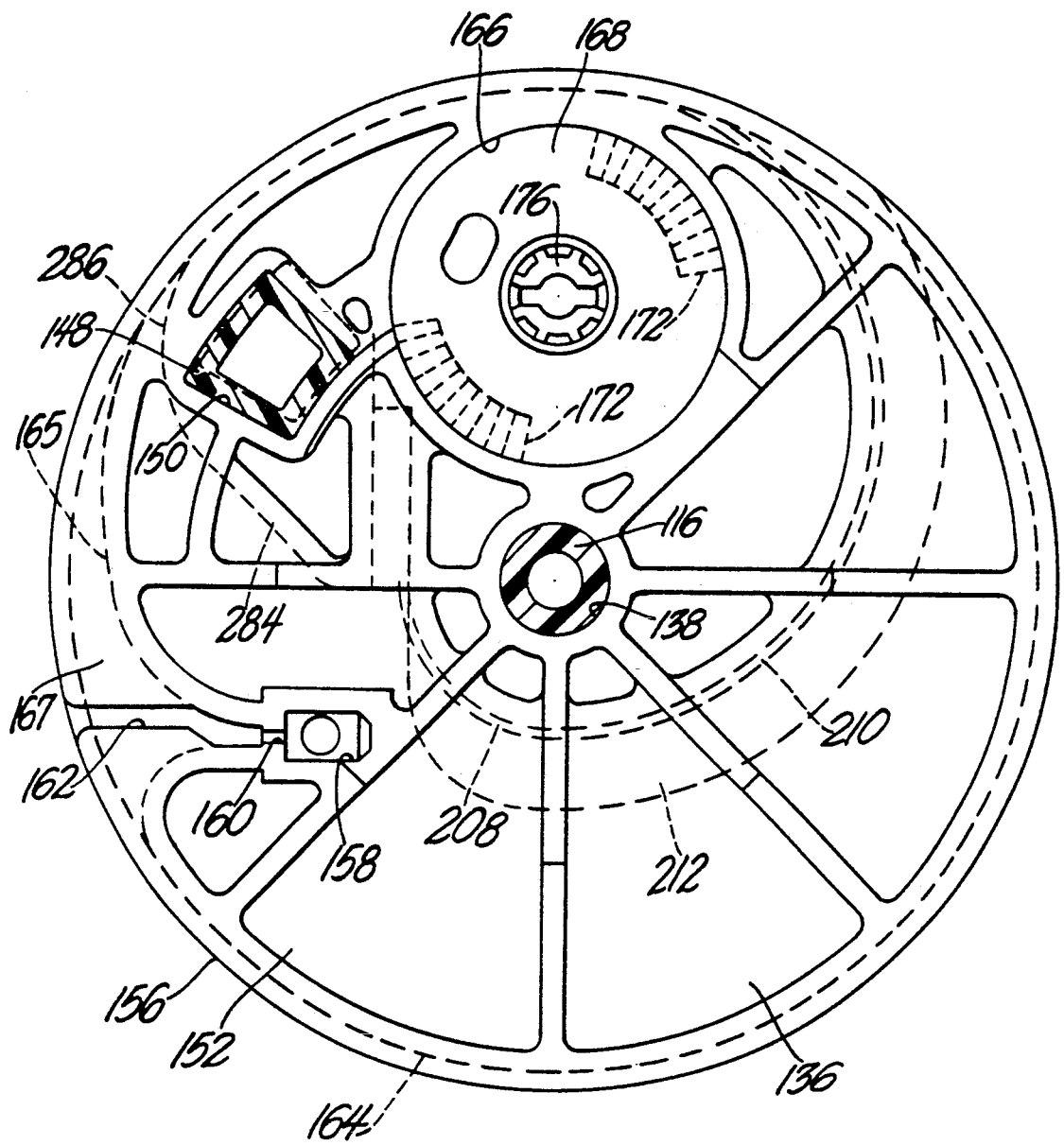
FIG. 8 is a sectional view of the cable drive pulley for the rear drive cable taken along line 8—8 in FIG. 5.

Vans such as the passenger van 10 shown in FIG. 1 have a hinged front passenger door 12 and a rear side passenger door. The rear side passenger door is commonly a sliding door 14 mounted on rollers which run in tracks. The sliding door 14 is generally on the side of the van 10 opposite the driver's station. The van 10 as shown in FIG. 1 has a driver's station on the left side and the sliding door 14 is on the right side. Cargo or utility vans are also generally equipped with a sliding side door 14. Sliding doors 14 provide large openings and avoid the danger of pivoting into an obstruction at the side of the van that would be encountered with a large hinged door.

Figure 9:
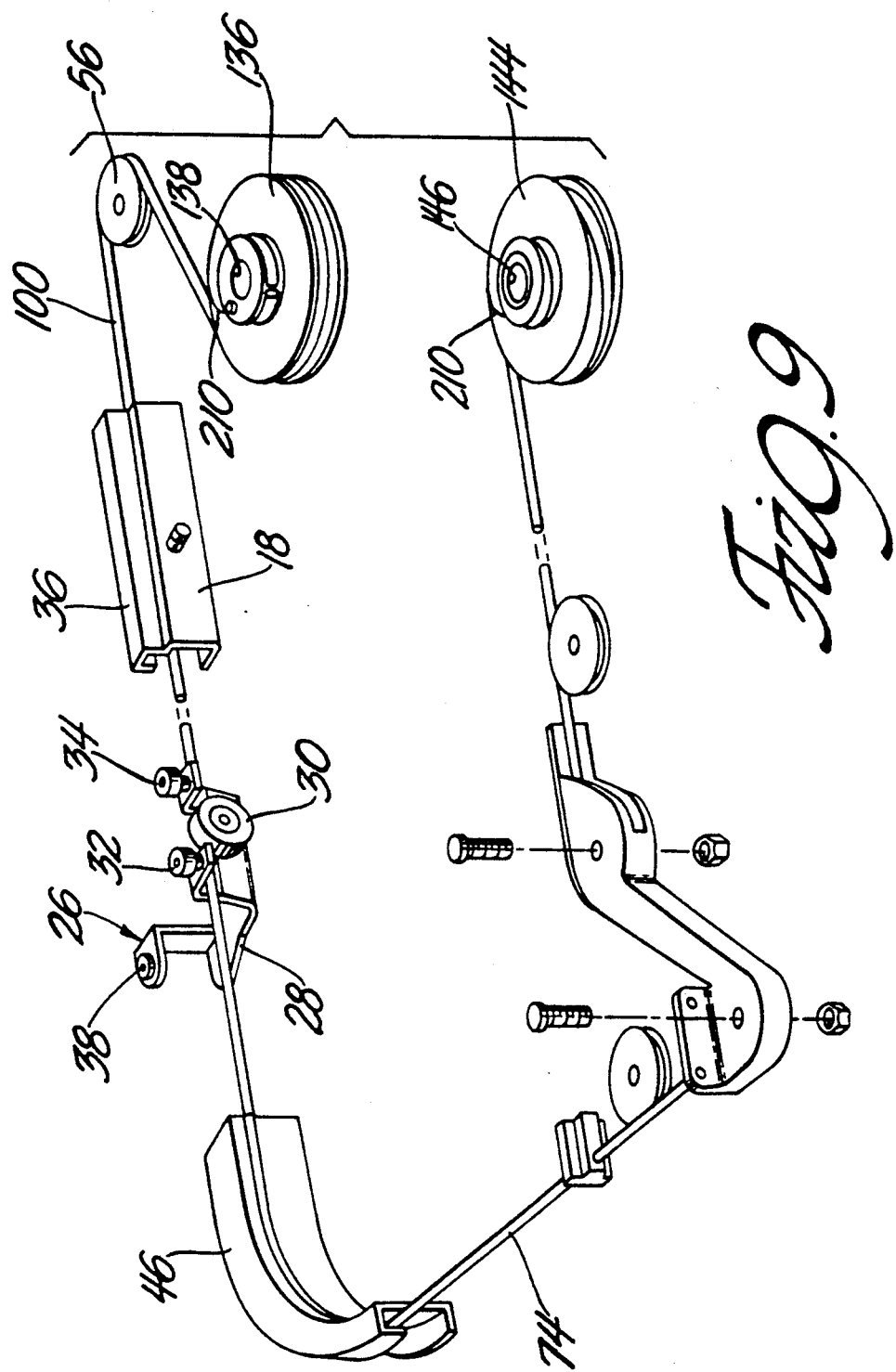
FIG. 9 is a schematic perspective view of a power sliding door and the track and roller system which supports and guides the door.
Figure 10:
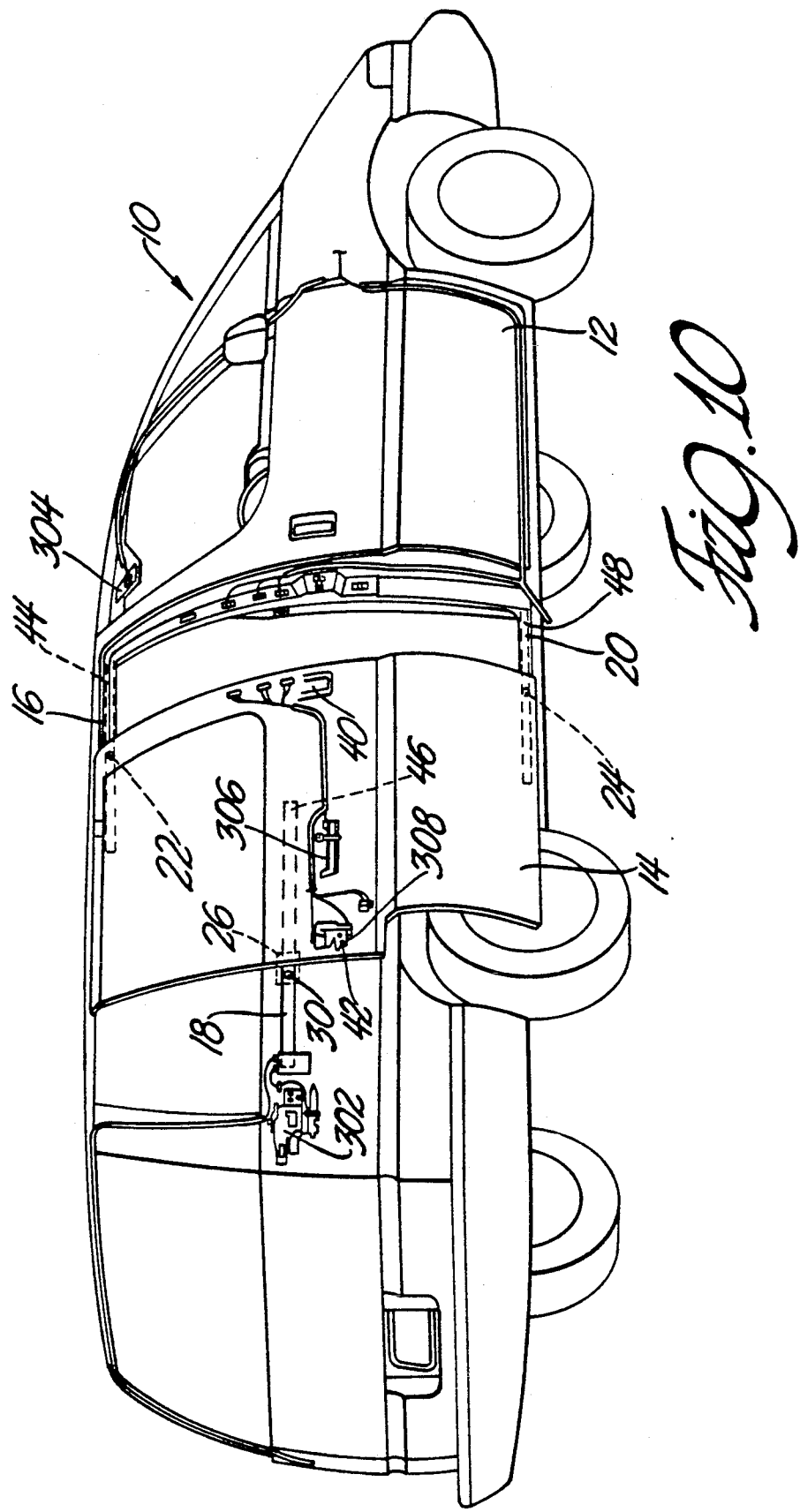
FIG. 10 is a schematic perspective view of a passenger van with a power sliding door partially open.

The power sliding door 14 is supported and guided by an upper track 16, a center track 18, and a lower track 20 as shown in FIGS. 9 and 10. An upper roller 22 is attached to the upper forward corner of the power sliding door 14 and runs in the upper track 16. A lower roller 24 is attached to the lower forward corner of the power sliding door 14 and runs in the lower track 20. A hinge and roller assembly 26 is pivotally attached to the rear portion of the power sliding door 14 between the upper and lower portions of the power sliding door. The hinge and roller assembly 26 has a carriage 28. A support roller 30, pivotally attached to the carriage 28 for rotation about a generally horizontal axis, supports the rear portion of the door and runs in the center track 18. Two guide rollers 32 and 34 are pivotally attached to the carriage 28 for rotation about generally vertical axes and run in an upper channel portion 36 of the center track 18. A vertical hinge pin passes through a pair of hinge apertures 38 in the carriage 28 and through hinge apertures in a bracket attached to the rear edge of the power sliding door 14 to connect the carriage to the power sliding door.

The power sliding door 14 moves horizontally inward toward the center of the van 10 for latching and sealing. Latches 40 and 42 are provided at the front and rear of the power sliding door 14 which moves horizontally inward to compress resilient seals and to latch. Inward horizontal movement of the sliding door 14 is obtained by curving the forward ends 44, 46 and 48 of the upper, center and lower tracks 16, 18 and 20 inwardly toward the center of the vehicle. When the hinge and roller assembly 26 passes around the curved forward end 46 of the center track 18, the hinge apertures 38 pivot inwardly and move the rear portion of the sliding door 14 horizontally inward toward the side of the van 10.

The power sliding door 14 opening and closing module 50 includes a stamped sheet metal panel 52, a front cable roller guide assembly 54, a rear cable roller guide assembly 56 and a cable drive assembly 58. The stamped sheet metal panel 52 has multiple apertures for fasteners that secure the panel to a van body frame. These apertures include a front aperture 60, upper apertures 62 and 64, rear aperture 66 and bottom aperture 68. The front cable roller guide assembly 54 includes a nylon housing 70, reinforced with glass fibers, that is secured to the stamped sheet metal panel 52 by four rivets 72. A front cable 74 passes around the outboard side of a rear pulley 76 that rotates on a shaft 78, around the inboard side of a front pulley 80 that rotates on a shaft 82, and then passes out of the front cable roller guide assembly 54 through a flexible rubber seal 84. A fastener passes through an aperture 86 in the forward portion of the front cable roller guide assembly 54, through an aligned aperture in the stamped sheet metal panel 52 and into the van body frame to fix the position of the front cable roller guide assembly 54 relative to the center track 18.

The rear cable roller guide assembly 56 includes a nylon housing 88, reinforced with glass fibers, that is secured to the stamped sheet metal panel 52 by two plastic fasteners 90 that pass through slots 92 in the nylon housing 88 and through apertures 94 in the stamped sheet metal panel 52. A tab 96 on the stamped sheet metal panel 52 extends horizontally through a slot 98 in nylon housing 88 and then upwardly to further secure the nylon housing 88 to the sheet metal panel. The slots 92 and the slot 98 in the nylon housing 88 permit forward and rearward movement of the rear cable roller guide assembly 56 relative to the stamped sheet metal panel 52. A rear cable 100 passes over the top of a front pulley that rotates on a horizontal shaft 104, around the side of a pulley 106 that rotates on a vertical shaft 108, and then passes out through an aperture in the side of the van body in the rear portion of the center track 18. A rigid cable seal 110, that is the shape of a truncated cone with a cable slot 111, is an integral part of the nylon housing 88 and passes through the aperture, in the side of the van body, for the rear cable 100. The rear cable roller guide assembly 56 is secured directly to the van body frame by fasteners which pass through apertures 112 in the nylon housing 88 and into the van body frame to fix the position of the rear cable roller guide assembly 56 relative to the rear portion of the center track 18. The slots 92 and the slot 98 in the nylon housing 88 allow the rear cable roller guide assembly 56 to be positioned in the desired location relative to the rear portion of the center track 18 independent of the stamped sheet metal panel 52. Allowing the nylon housing 88 to slide relative to the stamped sheet metal panel 52 allows the front cable roller guide assembly 54 and the rear cable roller guide assembly 56 to be positioned in the proper positions relative to the center track 18 and to accommodate variations in the dimensions of the center track 18 and the body of the van 10 in which the power sliding door opening and closing module 50 is mounted.

The front cable 74 extends from the cable drive assembly 58 to the front cable roller guide assembly 54 and to the hinge and roller assembly 26. The rear cable 100 extends from the cable drive assembly 58 to the rear cable roller guide assembly 56 and to the hinge and roller assembly 26. A free end of the front cable 74 and a free end of the rear cable 100 are attached to the hinge and roller assembly 26 to form a power sliding door drive cable that functions as an endless cable loop with the hinge and roller assembly being a link in the endless cable.

The cable drive assembly 58 includes a driven gear 114 made of nylon with graphite and glass fibers. The driven gear 114 includes an integral shaft 116 which is rotatably supported in an aperture 118 in the stamped sheet metal panel 52 and in an aperture 120 in the cable drive housing 122. The cable drive housing 122, which is made of nylon with graphite and glass fibers, is secured to the stamped sheet metal panel 52 by screws 124. The driven gear 114 is driven by a direct current electric motor 126, with a speed reduction gear box 128, and a drive gear 130 that is in mesh with the driven gear 114. The speed reduction gear box 128 houses a worm-type speed reducer with an output shaft 132. The drive gear 130 is rotatably journaled on the output shaft 132 and can be locked to the output shaft by an electromagnetic clutch 134 when it is desired to drive the driven gear 114. The electromagnetic clutch 134 permits manual opening and closing of the sliding door 14 when the clutch is disengaged.

A rear cable drive pulley 136, with a central bore 138, is mounted on the integral shaft 116 adjacent to the driven gear 114. A drive lug 140 on the rear cable drive pulley 136, that is radially spaced from the central bore 138, extends axially from the inboard side 154 of the rear cable drive pulley 136 and into a drive lug bore 142 in the driven gear 114. The lug 140 insures that the rear cable drive pulley 136 rotates with the driven gear 114.

A front cable drive pulley 144, with a central bore 146, is mounted on the integral shaft 116 adjacent to the rear cable drive pulley 136. A drive lug 148, on the front cable drive pulley 144 that is radially spaced from the central bore 146, extends axially from the front cable drive pulley 144 and into a drive lug bore 150 in the rear cable drive pulley 136. The drive lug 148 insures that the front cable drive pulley 144 rotates with the rear cable drive pulley 136 and the driven gear 114. The front cable drive pulley 144 is adjacent to the stamped sheet metal panel 52.

The rear cable drive pulley 136 is identical to the front cable drive pulley 144 to reduce the number of separate parts that are required. The functions to be performed by the front and rear cable drive pulleys 136 and 144 are not identical. As a result, both the front and rear cable drive pulleys 136 and 144 which are made from nylon with graphite and glass fiber reinforcement have some surfaces and features that are used on only one of the two cable drive pulleys. The front and rear cable drive pulleys 136 and 144 each have an outboard side 152 that faces toward the stamped sheet metal panel 52, an inboard side 154 that faces toward the cable drive housing 122 and the inside of the van 10, and a cylindrical outer surface 156 that is concentric with the integral shaft 116 and the axis of rotation of the driven gear 114. The outboard side 152 of the front and rear cable drive pulleys 136 and 144 has a front cable end anchor aperture 158, with a cable slot 160 and a cable passage 162, that extends radially outward from the anchor aperture 158 to the outboard end of a spiral cable groove 164 in the cylindrical outer surface 156. A curved cable groove 165 extends from the cable slot 160 to the spiral cable groove 164. A flange 167 retains the front cable 74 in the curved cable groove 165 on the front cable drive pulley 144. An axially extending cylindrical cable slack take-up bore 166 is in the inboard side 154 and is radially outward from the central bore 138 or 146 of the rear and front cable drive pulleys 136 and 144. The axially extending cable slack take-up bore 166 has a flat bottom wall 168, a central bore 170, and a pair of arcuate tooth racks 172. The teeth in the arcuate tooth racks 172 extend axially into the axially extending cable slack take-up bore 166 from the flat bottom wall 168. A cable slack take-up pulley 174 is inserted into the axially extending cylindrical cable take-up bore 166 in the rear cable drive pulley 136. The cable slack take-up pulley 174 has a hollow cylindrical shaft 176 extending axially from its outboard side that is journaled in the central bore 170 of the rear cable drive pulley 136. The end of the hollow cylindrical shaft 176 that protrudes through the bottom wall 168 has a series of slots that form flexible fingers 178. The fingers 178 have retainers 180 that extend radially outward from the hollow cylindrical shaft 176. A coil spring 182 is compressed between the outboard side 152 of the rear cable drive pulley 136 and the retainers 180. The pulley portion 184 of the cable slack take-up pulley 174 has a cable groove 186, a rear cable end anchor aperture 188 with a cable slot 190, and a cable passage 192 that extends radially outward to the cable groove 186. Teeth 194 extend axially from the outboard side of the pulley portion 184 and form a circular rack which engages the two arcuate tooth racks 172. The teeth 194 cooperate with the tooth racks 172 to prevent rotation of the cable slack take-up pulley 174 in one direction and to allow rotation of the cable slack take-up pulley 174 relative to the rear cable drive pulley 136 in the other direction to take up slack in the rear cable 100. The coil spring 182 biases the teeth 194 axially into engagement with the teeth in the arcuate tooth racks 172 to hold the cable slack take-up pulley 174 in a fixed position relative to the rear cable drive pulley 136. A cylindrical shaft 196 extends axially from the inboard side of the cable slack take-up pulley 174 and through an aperture 198 through the driven gear 114. The cylindrical shaft 196 has a central bore 200 and a central slot 202. The central bore 200 and the central slot 202 are for a special tool which can move the cable slack take-up pulley 174 axially in an inboard direction, to disengage the teeth 194 from the arcuate tooth racks 172, rotate the cable slack take-up pulley 174 to take up or let out the rear cable 100 and then allow the coil spring 182 to move the cable slack take-up pulley in an outboard direction to reengage the teeth 194 with the arcuate tooth racks. A surface 203 on driven gear 114 contacts a surface 205 on the cable slack take-up pulley 174 to limit axial movement of the cable slack take-up pulley and to protect the coil spring 182. The outer surface of the cylindrical shaft 196 can be provided with a hexagon-shaped surface 204 that will accommodate standard hand tools for turning the cable slack take-up pulley 174 to take up the rear cable 100. The teeth 194 will cooperate with the teeth in the arcuate racks 172 to cam the cable slack take-up pulley 174 axially and allow the take up of slack in the rear cable 100. The cable slack take-up pulley 174 must be manually moved axially to disengage the teeth 194 before it can rotate to loosen the rear cable 100.

A cable passage 206 in the inboard side 154 of the rear and front cable drive pulleys 136 and 144 extends generally tangentially from the cylindrical cable slack take-up bore 166 to a small diameter cable groove 208 with a constant radius from the axis of the integral shaft 116. The constant radius small diameter cable groove 208 is connected to the inner end of the spiral cable groove 164 in the cylindrical outer surface 156 by a cable transition groove 210 with a radius from the center of the central bore 138 or 146 that increases from the small constant radius cable groove 208 to the spiral cable groove 164. The cable transition groove 210 has a substantial flange 212 to retain a slack rear cable 100 or a slack front cable 74 in the transition groove 210.

The front cable 74 has one end anchored in the front cable end anchor aperture 158 in the front cable drive pulley 144 and extends from the front cable drive pulley 144 through the front cable roller guide assembly 54 and to the hinge and roller assembly 26. The rear cable 100 has one end anchored in the rear cable end anchor aperture 188 in the cable slack take-up pulley 174 carried by the rear cable drive pulley 136 and extends from the rear cable drive pulley through the rear cable roller guide assembly 56 and to the hinge and roller assembly 26. The front cable 74 and the rear cable 100 are both attached to the hinge and roller assembly 26 to essentially form a continuous cable loop. A continuous cable loop is capable of moving a sliding door 14 in one direction or the other if the length of the cable loop required to move the sliding door remains constant or substantially constant.

The power sliding door 14 slides relatively freely along most of the length of the tracks 16, 18 and 20. When the door reaches the forward portion of the tracks 16, 18 and 20 and moves along the curved forward ends 44, 46 and 48 of the tracks, more force is required to change the direction of movement, to compress the seals and to latch the door latches 40 and 42. The sliding door 14 should travel at a fairly high speed during most of its travel in the tracks 16, 18 and 20 so that people using the sliding door do not have to spend excessive time waiting for the door to open or to close. However, if the door moves at a fairly high rate of speed until the seal is compressed and the latches are latched, the sliding door 14 has to decelerate rapidly. Rapid deceleration causes large forces and requires increases in the weight and strength of some vehicle components. By slowing the rate of movement of the sliding door 14 before the door latches, it is possible to eliminate the large forces resulting from rapid deceleration and at the same time to provide increased force for compressing the door seals and for latching the door latches 40 and 42. This is accomplished by driving the front cable 74 with a small diameter pulley while compressing seals and latching latches and by unwinding the rear cable 100 from a small diameter pulley during seal compression and door latching. During the initial opening movement of the sliding door 14, the driven gear 114 drives the rear cable drive pulley 136 to first wrap the rear cable 100 in the cable groove 208 with a relatively small radius. Because the radius of the groove 208 is small, the rear cable 100 pulls the sliding door 14 at a relatively slower speed and increasing the torque to seal the door. The rear cable 100 engages the cable transition groove 210 as soon as the sliding door 14 has moved a short distance in the tracks 16, 18 and 20. The speed of movement of the power sliding door 14 is increased from the time the rear cable 100 is driven by the cable transition groove 210 at the connection between the small diameter cable groove 208 and the cable transition groove 210 until the rear cable starts to wrap in the spiral cable groove 164. The sliding door 14 moves rearwardly at a relatively higher speed as the rear cable 100 wraps up in the spiral cable groove 164.

During the initial opening movement of the sliding door 14, the driven gear 114 drives the front cable drive pulley 144 to first unwrap the front cable 74 from the small diameter cable groove 208 on the front cable drive pulley 144. Because the radius of the small diameter cable groove 208 is small, the front cable 74 unwinds relatively slowly from the front cable drive pulley 144. The front cable 74 next unwinds from the transition groove 210. The rate at which the front cable 74 unwinds from the transition groove 210 increases until the front cable 74 starts to unwrap from the spiral cable groove 164. The front cable 74 continues to unwind from the spiral cable groove 164 on the front cable drive pulley 144 until the power sliding door 14 is open and the direct current electric motor 126 is turned off. The electric motor 126 is turned off before the sliding door 14 is at the ends of the tracks 16, 18 and 20 and the cable drive assembly 58 can coast to a stop.

The power sliding door 14 is closed by reversing the electric motor 126 so that the front cable drive pulley 144 starts to wind the front cable 74 in the spiral cable groove 164. The front cable 74 is driven by and winds up on the spiral cable groove 164 until the sliding door 14 is about two-thirds of the distance from the fully open position to the closed and latched position. The front cable 74 then starts to wind up on the cable transition groove 210. Because the radius of the transition groove 210 is decreasing as the front cable 74 winds up on the transition groove 210, the speed at which the sliding door 14 is traveling decreases. After the front cable 74 is wound up on the entire transition groove 210, the front cable starts to wind up in the small diameter cable groove 208. As the front cable 74 winds up in the constant radius groove 208, it travels at a relative slower speed, is guided horizontally inwardly by the curved forward ends 44, 46 and 48 of the upper, center and lower tracks 16, 18 and 20, compresses the resilient seal and is latched in a closed position. The direct current electric motor 126 drives the driven gear 114 through the electromagnetic clutch 134 at a substantially constant speed and is capable of providing a substantially constant output torque. The small diameter of the constant radius cable groove 208 relative to the spiral cable groove 164 allows the cable drive assembly 58 to exert a much larger tension force on the front cable 74 during compression of the resilient seal and latching of the sliding door 14 than is exerted when the sliding door is driven by the front cable 74 wrapping up on the spiral cable groove 164 and the sliding door is traveling at a higher speed.

During closing of the power sliding door 14, the rear cable drive pulley 136 unwinds the rear cable 100 at substantially the same rate that the front cable drive pulley winds up the front cable 74. The rear cable 100 is first unwound from the spiral cable groove 164 as the sliding door 14 is accelerated rapidly and moves at high speed. When the sliding door is about two thirds of the distance from the fully open position to the closed and latched position, the rear cable 100 starts to unwind from the cable transition groove 210. The rate at which the rear cable 100 unwinds from the transition groove 210 decreases as the rear cable unwinds and the speed at which the power sliding door 14 moves decreases. After the rear cable 100 is unwound from the entire transition groove 210, the rear cable starts to unwind from the small diameter constant radius cable groove 208. Due to the small diameter of the constant radius small diameter cable groove 208, the rear cable 100 unwinds at a relatively slower rate. After the resilient seal is compressed and the sliding door 14 is latched in a closed position, the electric motor 126 is turned off and the electromagnetic clutch 134 is disengaged.

A cable tension system 220 is provided in the cable drive housing 122 for the cable drive assembly 58. The cable tension system 220 includes a front cable tensioner assembly 222 and a separate rear cable tensioner assembly 224. The front cable tensioner assembly 222 includes a fixed idler roller 226 and a spring biased idler roller 228. The fixed idler roller 226 is rotatably journaled in a bore 230 in the cable drive housing 122 and a bore 232 in the stamped sheet metal panel 52. The spring biased idler roller 228 is rotatably journaled in bores through bosses 234 in a U-shaped idler roller support bracket 236. The idler roller support bracket 236 has guide bosses 238 and 240 on each side. The guide bosses 238 and 240 on one side of the idler roller support bracket 236 are positioned in a slot 242 in the cable drive housing 122. The guide bosses 238 and 240 on the other side of the U-shaped idler support bracket 236 are positioned in a slot 244 in the stamped sheet metal panel 52. A coiled tension spring 246 is connected to the base of the U-shaped idler roller support bracket 236 and to an aperture 247 in the bottom of a cavity 248 in the cable drive housing 122. The base of the U-shaped idler roller support bracket 236 has stop surfaces 250 which contact the top of the cavity 248 and flanges 252 which telescope into the cavity when the U-shaped idler roller support bracket is positioned in the bottom of the slots 242 and 244. The spring biased idler roller 228 is positioned above the front cable 74 between the fixed idler roller 226 and the front cable drive pulley 144 and is biased into contact with the front cable 74. The spring biased idler roller 228 increases tension in the front cable 74 and tends to wrap the front cable on the front cable drive pulley 144 and to increase the amount of cable taken up in the front cable tensioner assembly 222. The U-shaped idler roller support bracket 236 slides upwardly in the slots 242 and 244 when tension in the front cable 74 forces the spring biased idler roller 228 upwardly and the coiled tension spring 246 is further loaded.

The separate rear cable tensioner assembly 224 includes a fixed idler roller 254 and a spring biased idler roller 256. The fixed idler roller 254 is rotatably journaled in a bore 258 in the cable drive housing 122 and a bore 260 in the stamped sheet metal panel 52. The spring biased idler roller 256 is rotatably journaled in bosses 262 in the U-shaped idler roller support bracket 264. The idler roller support bracket 264 has guide bosses 266 and 268 on each side. The guide bosses 266 and 268, on one side of the idler roller support bracket 264, are positioned in a slot 270 in the cable drive housing 122. The guide bosses 266 and 268 on the other side of the U-shaped idler support bracket 264 are positioned in a slot 272 in the stamped sheet metal panel 52. A coiled tension spring 274 is connected to the base of the U-shaped idler roller support bracket 264 and to an aperture 275 in the bottom of a cavity 276 in the cable drive housing 122. The base of the U-shaped idler roller support bracket 264 has a stop surface 278 which contacts the top of the cavity 276 and flanges 280 which telescope into the cavity when the U-shaped idler roller support bracket is positioned in the bottom of the slots 270 and 272. The spring biased idler roller 256 is positioned above the rear cable 100 between the fixed idler roller 254 and the rear cable drive pulley 136 and is biased into engagement with the rear cable 100. The spring biased idler roller 256 increases tension in the rear cable 100 and tends to wrap the rear cable on the rear cable drive pulley and to increase the amount of cable taken up in the rear cable tensioner assembly 256. The U-shaped idler roller support bracket 264 slides upwardly in the slots 270 and 272 when tension in the rear cable 100 forces the spring biased roller 254 upwardly and the coiled tension spring 274 is further loaded.

The spring biased idler roller 228 applies a force to the front cable 74 along a line that passes through the axis of rotation of the spring biased idler roller and through the center of the arc formed in the front cable by contact between the front cable and the spring biased idler roller. The line along which the spring biased idler roller 228 applies force to the front cable 74 is perpendicular to a tangent to the center of the arc formed in the front cable by contact between the spring biased idler roller and the front cable. The coiled tension spring 246 would exert maximum force on the front cable 74 by applying force to the spring biased idler roller 228 in the same direction as the spring biased idler roller applies force to the front cable 74. The slots 242 and 244 along which the U-shaped idler roller support bracket 236 slides are preferably parallel to the line along which the spring biased idler roller applies force to the front cable 74. The direction in which the spring biased idler roller 228 applies force to the front cable 74 is different when the front cable is driven by the spiral cable groove 164 on the front drive pulley 144 than the direction in which the spring biased idler roller applies force to the front cable when the front cable is driven by the small diameter cable groove 208. The change in the direction force is applied to the front cable 74 by the spring biased idler roller 228 can be reduced by spacing the spring biased idler roller further from the front cable drive pulley 144. The slots 242 and 244 are positioned so that they extend in a direction that is between the two directions in which the spring biased idler roller 228 applies force to the front cable 74.

The above explanation concerning the placement of the front cable tensioner assembly 222 also applies to the placement o the rear cable tensioner assembly 224. This arrangement of the slots 242, 244, 270 and 272 tends to keep the cable tension substantially constant for a given elongation of the coiled tension springs 246 and 274.

The power sliding door 14 opening and closing module 50 is installed in a van 10 with the rear cable 100 unwrapped from the cable slack take-up pulley 174. After the opening and closing module 50 is secured to the van body frame, the front cable 74 is attached to the hinge and roller assembly 26 and the rear cable 100 is attached to the hinge and roller assembly. The sliding door 14 is manually moved to or nearly to the closed position. With the sliding door either in or close to the closed position, the cable slack take-up pulley 174 is rotated to wrap the rear cable 100 in cable groove 186. As the rear cable 100 is wrapped on the cable slack take-up pulley 174, slack is removed from the front and rear cables 74 and 100 and the cables engage the spring biased idler rollers 228 and 256. Continued rotation of the cable slack take-up pulley 174 lifts the U-shaped idler roller support brackets 236 and 264 from the top of the cavities 248 and 276 and loads the coiled tension springs 246 and 274. When the U-shaped idler roller support brackets 236 and 264 have been raised to positions which provide the desired preload on the coiled tension springs 246 and 274 and the desired cable tension in the front and rear cables 74 and 100, the cable slack take-up pulley 174 is allowed to move axially so that the teeth 194 engage the tooth racks 172 and the cable slack take-up pulley 174 is locked in a fixed position relative to the rear cable drive pulley 136. If tension in the front and rear cable 74 and 100 needs to be changed or readjusted, the cable slack take-up pulley 174 can be moved axially away from the tooth racks 172 and the cable slack take-u pulley 174 can be rotated to either increase tension or decrease tension in the front and rear cables 74 and 100. When the tension is properly set, the cable slack take-up pulley 174 is moved axially so that the teeth 194 engage the tooth racks 172 and lock the cable slack take-up pulley 174 relative to the rear cable drive pulley 136.

The cable drive housing 122 has a plurality of cable retainer bars 282. The cable retainer bars 282 are parallel to the axis of rotation of the integral shaft 116 of the driven gear 114 and extend radially inward toward the cylindrical outer surface 156 of the front and rear cable drive pulleys 136 and 144. The retainer bars 282 do not contact the cylindrical outer surfaces 156 but are sufficiently close to retain the front and rear cables 74 and 100 in the spiral cable grooves 164 on the rear and front cable drive pulleys 136 and 144.

The guide surface 284, on the inboard side 154 of the front and rear cable drive pulleys 136 and 144, is in alignment with the small diameter cable groove 208 and is parallel to a tangent to the small diameter cable groove. The radially outer end of the guide surface 284 is connected to the spiral cable groove 164 by an arcuate surface 286. During normal operation of the power sliding door opening and closing module 50, neither the front or rear cables 74 and 100 contact the guide surface 284. The rear cable 100 extends from the cable slack take-up pulley 174, through the cable passage 2u6, and along the small diameter cable groove 208 and the cable transition groove 210. The rear cable 100 extends away from the guide surface 284 and would not contact the guide surface. When the sliding door 14 is moved to the closed position, the front cable 74 is wrapped up in the spiral cable groove 164, in the cable transition groove 210 and in the small diameter cable groove 208. The sliding door 14 should be closed and the direct current electric motor 126 should be turned off well before the front cable 74 contacts the guide surface 284. In the event that there is a malfunction of the control system 300 or the front or rear cable 74 or 100 fails, the front cable 74 will be directed into the spiral cable groove 164 by the guide surface 284 and the arcuate surface 286. The rear cable 100 could also be directed into the spiral cable groove 164 by the guide surface 284 and the arcuate surface 286 in the event of some cable failures. By directing the front or rear cable 74 or 100 into the spiral cable groove 164, binding of a cable between the rear cable drive pulley 136 Or the front cable drive pulley 144 and the cable drive housing 122 can be avoided. Such binding could damage the sliding door opening and closing module 50.

The control system 300, as shown in Figure 10, for controlling the opening and closing of the sliding door 14 can be a micro-processor controlled system with a controller 302, appropriate control switches, and appropriate sensors. Upon receiving an open signal from a control switch 304, the controller 302 activates an electrical door lock release 306 and unlatches the door latches 308. When sensors (not shown) sense that the sliding door 14 is unlatched, the controller 302 activates the power sliding door opening and closing module 50 to open the sliding door. When a sensor (not shown) indicates that the sliding door 14 is open, the controller 302 deactivates the direct current electric motor 126. Upon receiving a closed signal from a control switch 304, the controller 302 activates the power sliding door opening and closing module 50 to close the sliding door 14. When a sensor (not shown) indicates that the sliding door 14 is latched closed, the controller 302 deactivates the direct current electric motor 126.

Figure 11:
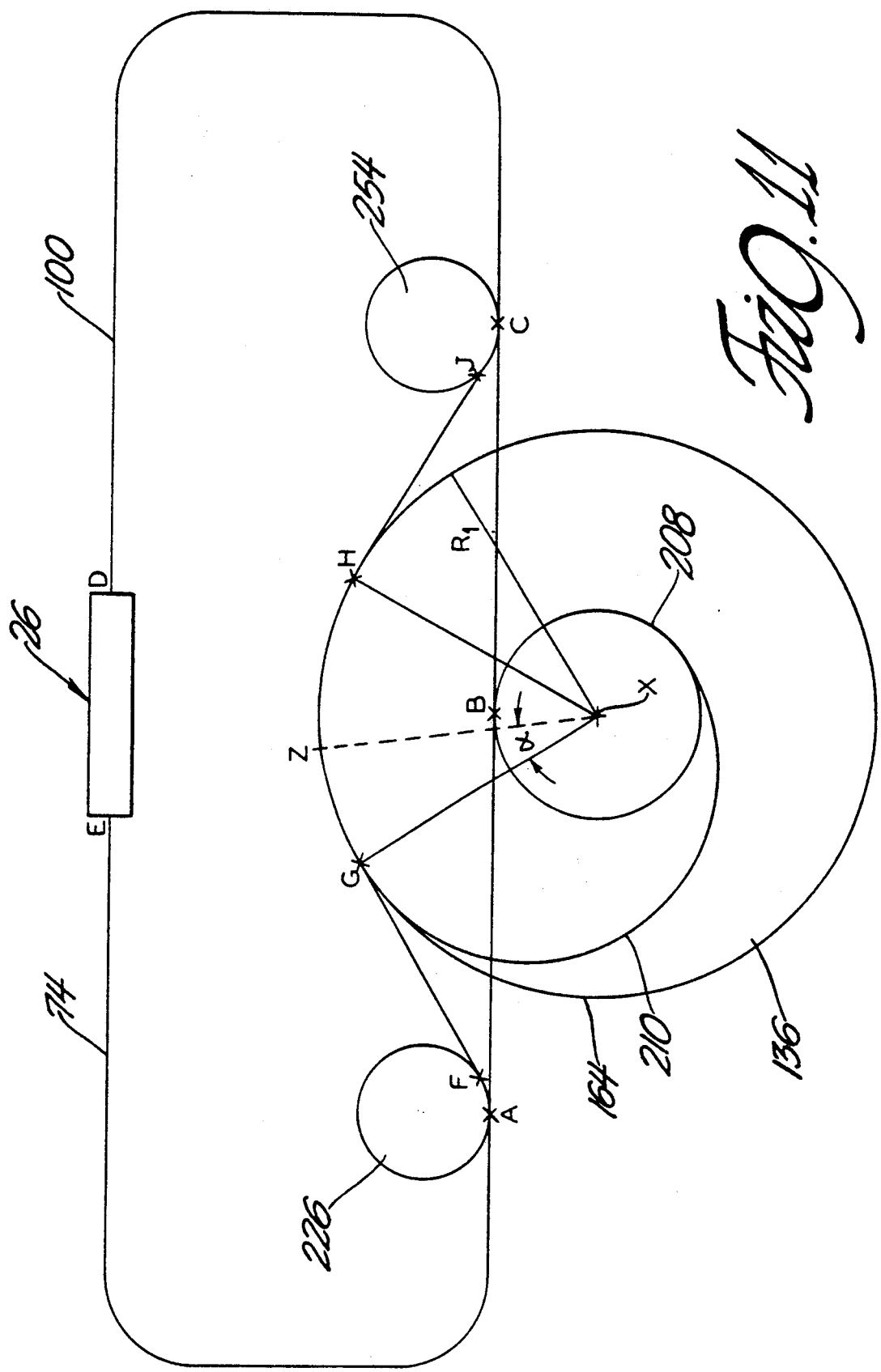
FIG. 11 is a simplified schematic of a sliding door opening and closing cable and cable drive without cable tensioners.

A simplified schematic of the cable drive system is shown in FIG. 11. The schematic includes the rear cable drive pulley 136, the front cable drive pulley 144 behind the rear cable drive pulley, the fixed idler roller 226, the fixed idler roller 254, and the hinge and roller assembly 26 that is guided by the center track 18. The rear and front cable drive pulleys 136 and 144 include the large diameter spiral cable grooves 164, the small diameter constant radius cable grooves 208, and the cable transition grooves 210. The front cable 74 is shown on the large diameter spiral cable groove 164 as well as on the small diameter constant radius cable groove 208. The rear cable 100 is also shown on the large diameter spiral cable groove 164 as well as on the small diameter constant radius cable groove 208. When the sliding door 14 is closed, the front cable 74 and the rear cable 100 are both extending from the small diameter constant radius cable grooves 208. When the sliding door 14 is open, the front cable 74 and the rear cable 100 both extend from the large diameter spiral cable grooves 164. For convenience and simplification, the fixed idler rollers 226 and 254 are positioned so that the front cable 74 and the rear cable 100 are in a straight line between the fixed idler rollers 226 and 254 when the front and rear cables 74 and 100 extend out from the small diameter cable grooves 208.

The portion AE of the front cable 74 plus the portion CD of the rear cable 100, in an ideal system and as shown in FIG. 11, have a constant total length. The length of cable between points A and C on the small diameter constant radius cable grooves 208 is obviously less than the length of cable on the large diameter spiral cable grooves 164. If the length of cable between points A and C were the same on both the small diameter constant radius cable grooves 208 and the large diameter spiral cable grooves 164, the system would be balanced because the total length of cable in either path would be the same. In a balanced cable length system, the length of cable sections AB +BC is equal to the length of cable sections AF+FG+GH+HJ+JC. It should be noted that cable sections AF, GH and JC are arcs. Subtracting the length AB+BC from the length AF+FG +GH+HJ+JC gives the extra length of cable between points A and C on the large diameter spiral cable grooves. Knowing the extra length of cable between points A and C on the large diameter spiral cable grooves 164 and the radius of the large diameter cable groove, the angular space required to store the extra cable length can be calculated. Rotation of the rear cable drive pulley 136 relative to the front cable drive pulley 144 to remove the extra cable from the spiral cable groove 164 also rotates the small diameter constant radius cable groove 208. When one of the spiral cable grooves 164 is rotated to remove cable stored in the system, one of the small diameter constant radius cable grooves 208 adds cable to the system from the small diameter constant radius cable grooves 208. The cable added to the system when it is being driven by the small diameter constant radius cable grooves 208 has to be considered when balancing cable length.

The angle required to remove the section of extra cable on the large diameter cable grooves 164 and to account for cable added by the small diameter cable grooves 208 to balance cable length is represented by the angle α in FIG. 11. The angle α is the angle between the line XG and the line XZ. The extra cable that needs to be removed from the system to balance the system is the arc length GZ.

The angle α is referred to as the offset angle. The offset angle is calculated by the following formula:

$$\text{OFFSET ANGLE } \alpha = \frac{LDL - SDL}{\pi/180 \times (LR - SR)}$$

Where LR=Large Radius
SR=Small Radius
LDL=Large Diameter Effective Loop Length
SDL=Small Diameter Effective Loop Length If we draw a tangent to the spiral cable groove 164 through point Z and then pivot point A on the fixed idler roller 226 in an arc about point B until point A contacts the tangent through point Z, the arc length GZ is removed from the system and the system is approximately balanced. The system is not exactly balanced because moving the fixed idler roller 226 changes the location of point F and the location of point B. It is, however, close to being balanced for cable length.

There are an infinite number of positions for the fixed idler rollers 226 and 254 which will require the same total length of cable in the cable loop when the front and rear cables 74 and 100 are on the large spiral cable grooves 164 as when the front and rear cables are on the small diameter constant radius grooves 208. The location of these positions for the fixed idler rollers 226 and 254 depends upon the diameter of the small diameter constant radius grooves 208, the diameter of the spiral cable grooves 164, the diameter of the fixed idler rollers 226 and 254 and the location of the fixed idler roller relative to the axis of rotation of the rear cable drive pulley 136 and the front cable drive pulley 144. If we elect to have the fixed idler rollers 226 and 254 the same predetermined distance from the axis of rotation of the rear and front cable drive pulleys 136 and 144, there is one position for the fixed idler roller 226 and one position for the fixed idler roller 254 that will balance the effective lengths of the front and rear cables 74 and 100 in the continuous cable loop that drives the sliding door 14. The determination of the locations of the fixed idler rollers 226 and 254 which will precisely balance the system is difficult to calculate. Changing the position of one of the fixed idler rollers 226 or 254 changes the relationship between the fixed idler roller and the front or rear cable 74 or 100 when the cable is in contact with the spiral groove 164 and when the cable is in contact with the small diameter constant radius groove 208, and also changes the relationship between the cable and the spiral cable groove 164 and the relationship between the cable and the small diameter constant radius groove 108.

By placing the fixed idler rollers 226 and 254 in the proper location, the effective length of cable in the cable loop driving the sliding door 14 when the front and rear cables 74 and 100 extend out from the spiral cable groove 164 will be the same as the effective length of the cable loop driving the sliding door when the front and rear cables extend out from the small constant diameter radius grooves 208. The cable length can also be balanced by rotating the front and rear cable drive pulleys 144 and 136 relative to each other to remove excess cable and leaving the fixed idler rollers 226 and 254 in the positions shown in FIG. 11. It would also be possible to balance cable length by rotating the front and rear cable drive pulleys 144 and 136 relative to each other to remove part of the excess cable and moving the fixed idler rollers 226 an 254 to remove the remainder of the excess cable.

Manufacturing variations and errors makes it impossible to maintain exactly the same effective length of cable in the system at all times. The tracks 16, 18 and 20 that guide the sliding door 14 vary in shape as do the various rollers in the system. Most of these variations are small and have little effect on operation of the door opener. The hinge and roller assembly 26 has a substantial effect on the total length of cable required in the system. When the hinge and roller assembly 26 is traveling in the straight portion of the center track 18, the front cable 74 is in contact with the surface of the curved forward end 46 of the center track. As the hinge and roller assembly 26 enters the curved forward end 46 of the center track 18, the front cable 74 is held out from the inside surface of the curved forward end. This requires an increase in the length of cable in the cable loop. The increased length of cable is required at the same time the speed of movement of the sliding door 14 is decreased and more force is applied to the slid...g door 14 to move the door inward, compress the door seal, and to latch the sliding door in a closed position.

The rate of movement of the sliding door 14 is decreased by changing the driving surface from the spiral cable groove 164 to the small diameter cable groove 208 with a small constant radius. By changing the timing between the cable transition groove 210 on the rear cable drive pulley 136 and the front cable drive pulley 144 so that the front cable 74 starts to be wrapped up on the transition groove 210 on the front cable drive pulley 144 while the rear cable 100 is still being unwrapped from the spiral cable groove 164 on the rear cable drive pulley 136, extra cable is fed into the cable loop and the slack necessary for the hinge and roller assembly 26 to travel along the curved forward end 46 of the center track 18 is available. The change in timing required is a few degrees. The timing change is obtained by offsetting the lug 140 and the lug 148 on the cable drive pulleys 136 and 144 from the bore 150 in the cable drive pulleys.

Offsetting the transition groove 210 on the rear cable drive pulley 136 relative to the transition groove 210 on the front cable drive pulley 144 means that the rate at which the front cable 74 is fed into the continuous loop is different than the rate at which the rear cable 100 is removed from the continuous loop when the sliding door 14 is being opened during a portion of the rotary movement of the front and rear drive pulleys. The amount of cable in the continuous loop also varies when the sliding door 14 is being closed. Because the amount of extra cable fed into or taken from the continuous loop is not identical to the extra length of cable required as the hinge and roller assembly 26 moves along the curved end 46 of the center track 18 and because the transition grooves 210 are not timed precisely with the hinge and roller assembly 26, a cable tension system is required to maintain cable tension. A cable tension system is also required to accommodate temperature changes, manufacturing errors and variations and to accommodate deviations in the design of the power sliding door opening and closing module 50 from the ideal. The cable tension system must insure that the position of the sliding door 14 is positively controlled at all times. The front cable 74 and the rear cable 100 must both exert a force on the hinge and roller assembly 26 at all times during normal operation of the sliding door 14 opening and closing module 50. If extra cable is fed into the continuous cable loop and the front or rear cable 74 or 100 become slack, the sliding door 14 can make an unplanned movement that will result in high impact loads in the system. A loose cable may also become fouled.

The cable tension system 220, as set forth earlier, accommodates the need for variations in the length of the cable loop, set forth above, and maintains adequate tension on the front cable 74 and the rear cable 100 at all times. The cable tension required depends upon the size and weight of the sliding door 14 to be closed, the force required to latch the sliding door closed, and the force required to accelerate and move the sliding door.

Figure 12:
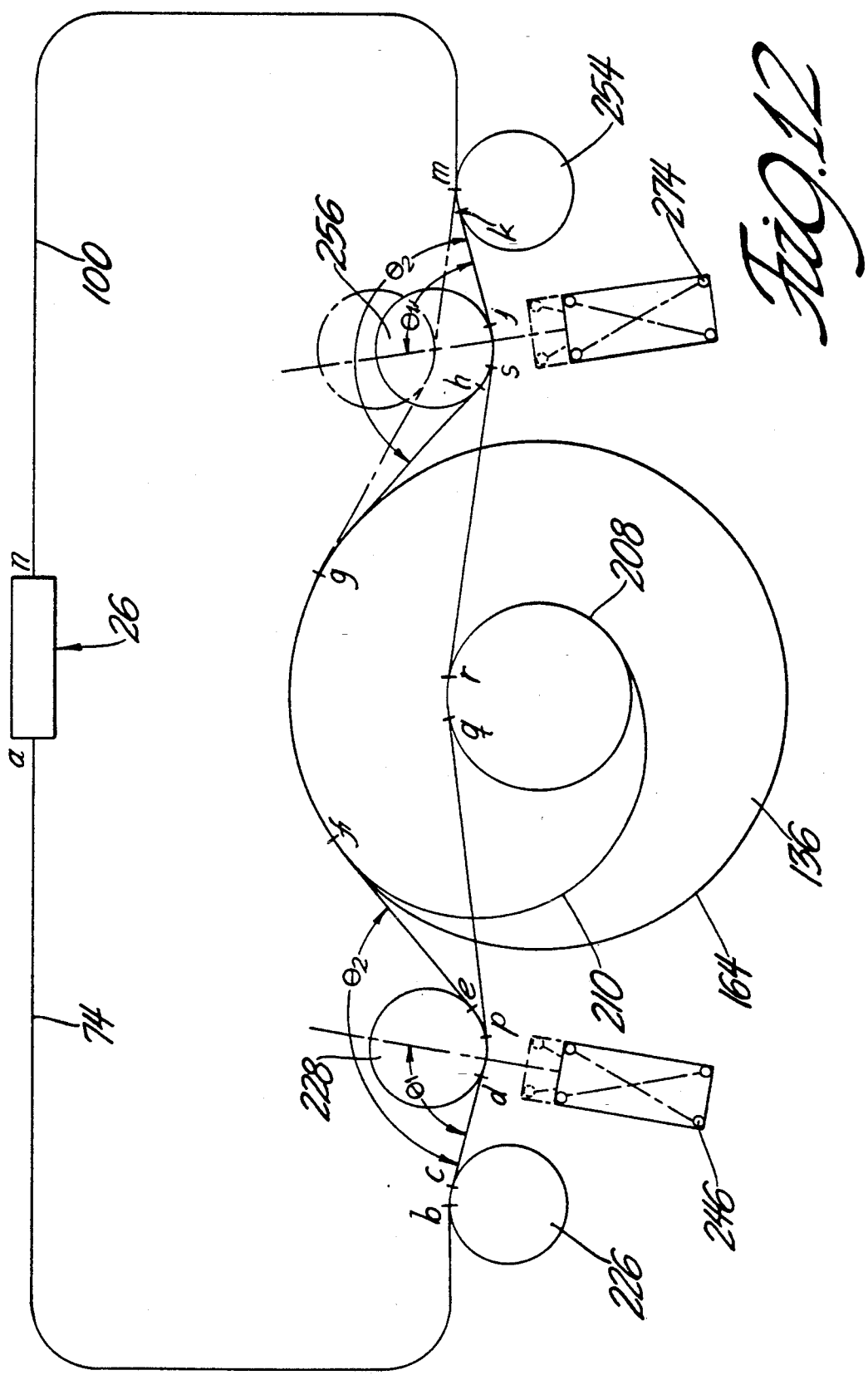
FIG. 12 is a simplified schematic of a sliding door opening and closing cable and cable drive with cable tensioners.

FIG. 12 is a simplified schematic of the sliding door 14 opening and closing system. The spring biased idler rollers 228 and 256 must be balanced to provide the required tension in the front cable 74 and the rear cable 100 when the cables are driven by the spiral cable grooves 164 and when the cables are driven by the small diameter cable grooves 208 with a small constant radius. By balancing cable tension, the effort required to manually open the sliding door 14 is substantially the same when the front and rear cables 74 and 100 are in the small diameter cable grooves 208 as when the front and rear cables are in the large diameter spiral cable grooves 164. The cable tension when the front and rear cables 74 and 100 are driven by the small diameter constant radius cable groove 208 can be balanced with the cable tension when the cables are driven by the spiral cable grooves 164 by altering the effective cable length of the system. The effective cable length stored on the spiral cable grooves 164 can be reduced by offsetting the rear cable drive pulley 136 relative to the front cable drive pulley 144. The length of cable stored on the spiral cable grooves 164 can also be changed by changing the point at which a cable extends outwardly or tangentially away from the spiral cable grooves.

The first step to balance cable tension is to calculate the angle between the line of travel of the spring biased idler rollers 228 and 256 and cable between the fixed idler rollers 226 and 254 and the spring biased idler rollers with the spring biased rollers in different positions. This is the angle $\theta_1$ in FIG. 12. The angle $\theta_2$ formed by the front and rear cables 74 and 100 on both sides of the spring biased idler rollers 228 and 256 with the idler rollers in different positions is also calculated. The angles $\theta_1$ and $\theta_2$ are calculated with the front and driven by the spiral cable grooves 164 and when the cables are driven by the small diameter cable grooves 208 with a small constant radius. By balancing cable tension, the effort required to manually open the sliding door 14 is substantially the same when the front and rear cables 74 and 100 are in the small diameter cable grooves 208 as when the front and rear cables are in the large diameter spiral cable grooves 164. The cable tension when the front and rear cables 74 and 100 are driven by the small diameter constant radius cable groove 208 can be balanced with the cable tension when the cables are driven by the spiral cable grooves 164 by altering the effective cable length of the system. The effective cable length stored on the spiral cable grooves 164 can be reduced by offsetting the rear cable drive pulley 136 relative to the front cable drive pulley 144. The length of cable stored on the spiral cable grooves 164 can also be changed by changing the point at which a cable extends outwardly or tangentially away from the spiral cable grooves.

The first step to balance cable tension is to calculate the angle between the line of travel of the spring biased idler rollers 228 and 256 and cable between the fixed idler rollers 226 and 254 and the spring biased idler rollers with the spring biased rollers in different positions. This is the angle $\theta_1$ in FIG. 12. The angle $\theta_2$ formed by the front and rear cables 74 and 100 on both sides of the spring biased idler rollers 228 and 256 with the idler rollers in different positions is also calculated. The angles $\theta_1$ and $\theta_2$ are calculated with the front and rear cables 74 and 100 being driven by both the small diameter constant radius cable grooves 208 and by the spiral cable grooves 164. The angle $\theta_2$ for the front cable tensioner 222 is the angle between the cable segments cd and ef when the front cable 74 is driven by the large diameter spiral cable groove 164 and the angle between the cable segments cd and pq when the front cable 74 is driven by the small diameter constant radius cable groove 208. The angle $\theta_2$ for the rear cable tensioner 224 is the angle between the cable segments jk and gh when the rear cable 100 is driven by the large diameter spiral cable groove 164 and the angle between the cable segments jk and rs when the rear cable 100 is driven by the small diameter constant radius cable groove 208.

Step two is to calculate the cable tension when the front and rear cables 74 and 100 are driven by the small diameter cable grooves 208 for both the front cable and the rear cable with the spring biased idler rollers 228 and 256 in the different positions for which angles $\theta_1$ and $\theta_2$ were calculated. The formula for determining cable tension is:

$$\text{CABLE TENSION} = \frac{[(TT \times SR) + PT] \times \cos(\theta_1 - \theta_2)}{2 \cos \theta_2}$$

Where
TT = Tensioner Travel
SR = Spring Rate
PT = Pre-Tension in the Springs

Step three is to calculate the cable tension, when the front and rear cables 74 and 100 are driven by the spiral cable grooves 164, for both the front cable and the rear cable with the spring biased idler rollers 228 and 256 in the different positions for which angles $\theta_1$ and $\theta_2$ were calculated. The cable tension is calculated using the formula set forth above. The position of the spring biased idler rollers 228 and 256 in the slots 242, 244, 270 and 272 that provide the desired cable tension can be determined.

Step four is to determine the effective lengths of the front cable 74 and the rear cable 100 with the cables driven by the small diameter constant radius cable grooves 208 and with the cables driven by the spiral cable grooves 164. The effective length of the front and rear cables 74 and 100 with the cables driven by the spiral cable groove 164 and with the spring biased idler rollers 228 and 256 in the position which provides the desired tension in the front and rear cables is: Effective length (driven by spiral groove 164) = ELLD = segment ab + arc bc + segment cd + arc de + segment ef + arc fg + segment gh + arc hj + segment jk + arc km + segment mn.

Effective length (driven by small diameter cable groove 208) = ELSD = segment ab + arc bc + segment cd + arc dp + segment pg + arc gr + segment rs + arc sj + segment jk + arc km + segment mn.

Step five is to determine the difference in the two effective lengths and then determine the offset angle $\theta_t$ between the rear cable drive pulley 136 and the front cable drive pulley 144 to remove the difference between the two effective lengths. The offset $\theta_t$ angle is calculated by the following formula:

$$\text{Offset Angle } \theta_t = \frac{ELLD - ELSD}{\pi/180 \, (LR - SR)}$$

LR = radius of spiral groove 164
SR = radius of cable groove 208

One of the fixed idler rollers 226 or 254 and the adjacent spring biased idler roller 228 or 256 can be rotated about the axis of the rear cable drive pulley 136 and the axis of the front cable drive pulley 144 by the offset angle $\theta_t$ to balance the cable tension system 220. The cable tension can also be balanced by rotating the rear cable drive pulley 136 relative to the front cable drive pulley 144 by the offset angel $\theta_t$ without moving the fixed idler rollers 226 and 254 and the spring biased idler rollers 228 and 256. The cable tension can also be balanced by a combination of the two procedures to remove the same total length of excess cable.

Adjustment of the cable tension with the power sliding door 14 opening and closing module 50 disclosed and with dimensions chosen for the cable drive pulleys 136 and 144, the idler rollers 226, 228, 254 and 256, with the coiled tension springs 246 and 274 that are used and with other variables requires an offset angle that is a little larger than the offset angle $\alpha$ required to balance the length of the cables 74 and 100. Because the offset $\theta_t$ to balance cable tension angle is larger than the offset angle $\alpha$ to balance cable length, moving the fixed idler roller 226 or 254 by the larger offset angle $\theta_t$ over adjusts cable length. Because the offset angle $\theta_t$ over adjusts cable length, the front cable tensioner 222 and the rear cable tensioner 224 are drawn to balanced tension positions.

A cable tension system other than the cable tension system 220 can be used with the door opening and closing module 50 if desired. If a different cable tension system is used, the location of the fixed idler rollers 226 and 254 must be determined which will balance the cable length as set forth above. With a different cable tension system the offset angle to balance cable length may be the same or larger than the offset angle $\theta_t$ to balance cable tension.

Figure 13:
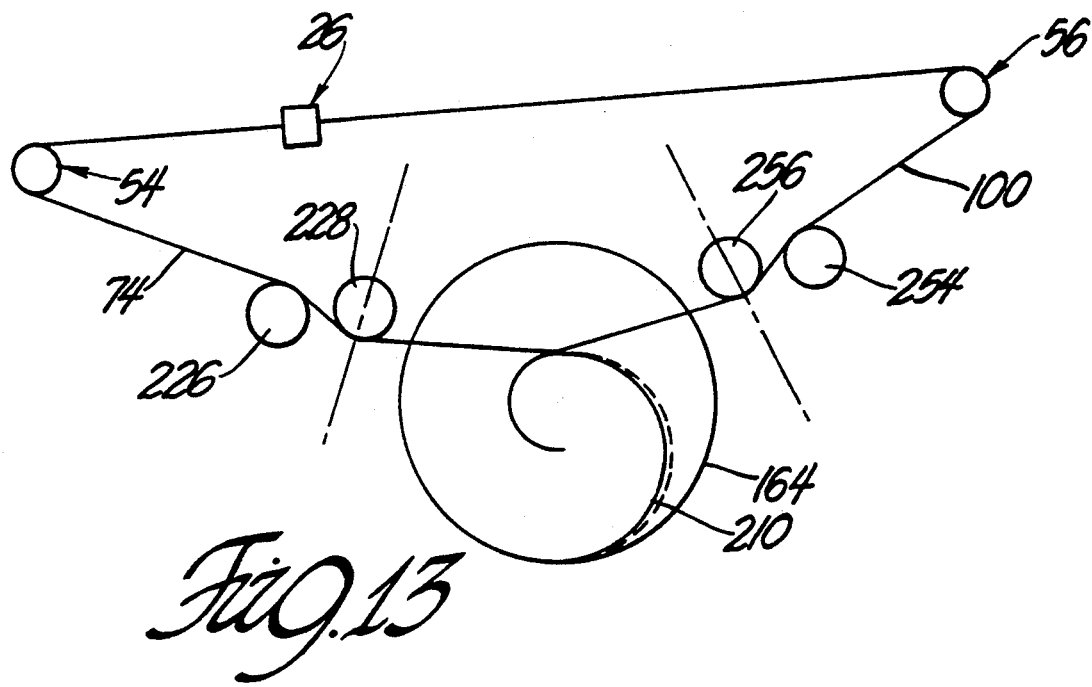
FIG. 13 is a schematic of the sliding door cable drive shown in FIGS. 2 through 8 with the cables being driven by the small diameter radius cable groove.
Figure 14:
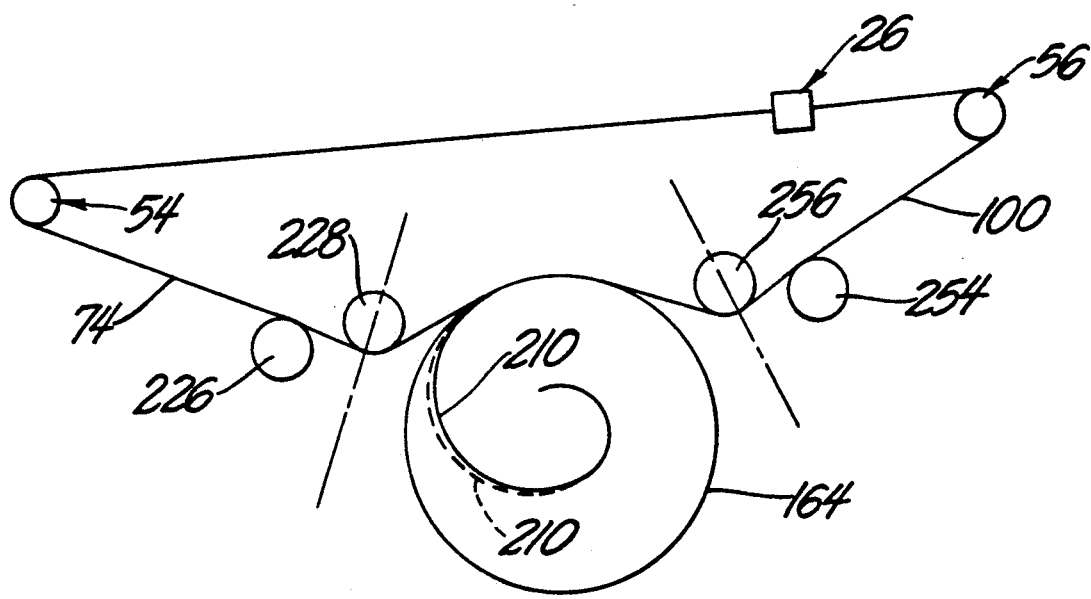
FIG. 14 is a schematic of the sliding door cable drive similar to FIG. 13 with the cables being driven by the large radius spiral cable groove.

FIGS. 13 and 14 are schematics of the cable drive disclosed above. The position of the fixed idler rollers 226 and 254, the spring biased idler rollers 228 and 256, and the offset between the transition groove 210 on the rear cable drive pulley 136 and the transition groove 210 on the front cable drive pulley 144 is clearly shown. The transition groove 210 shown in a solid line is the groove for the front cable 74 on the front cable drive pulley 144. The transition groove 210 shown in a broken line is the groove for the rear cable 100 on the rear cable drive pulley 136. The offset occurs because the drive lug 140 on the rear cable drive pulley 136 is offset from the bore 150 in the rear cable drive pulley, and the drive lug 148 on the front cable drive pulley 144 is offset from the bore 150 in the front cable drive lug. When the drive lug 148 on the front cable drive pulley 144 is inserted into the bore 150 in the rear cable drive pulley 136, the timing between the transition groove 210 on the rear cable drive pulley 136 and the transition groove 210 on the front cable drive pulley 144 is set.

While preferred embodiments and methods of the invention have been shown and described, other embodiments will now become apparent to those skilled in the art. Accordingly, the invention is not to be limited to that which is shown and described but by the following claims.

What is claimed is:

1. A sliding door opening and closing system for a vehicle including a vehicle frame; at least one sliding door track mounted on the vehicle frame; a sliding door supported by the sliding door track and moveable along the sliding door track between a closed position and an open position; and a closed loop cable closure system mounted on the vehicle frame and including a cable drive with a front cable drive pulley having a large diameter cable groove and a small diameter cable groove mounted on the vehicle frame for rotation about an axis, a rear cable drive pulley having a large diameter cable groove and a small diameter cable groove mounted on the vehicle frame for rotation about an axis, a motor that drives the front and rear cable drive pulleys in one direction to open the sliding door and in another direction to close the sliding door, a front cable that extends from the front cable drive pulley to the sliding door, a rear cable that extends from the rear cable drive pulley to the sliding door, a fixed idler roller mounted on the vehicle frame and spaced from the front cable drive pulley, a spring biased roller mounted on the frame between the front cable drive pulley and the fixed idler roller and spring biased into contact with the front cable to apply tension to the front cable and wherein the fixed idler roller and the spring biased roller are mounted in positions which provide a cable tension when the front cable is driven by the large diameter cable groove that is substantially equal to the cable tension when the front cable is driven by the small diameter cable groove.

2. A sliding door opening and closing system for a vehicle including a vehicle frame; at least one track mounted on the vehicle frame; a sliding door supported by the track and movable along the track between a closed position and an open position; and a closed loop cable closure system mounted on the vehicle frame and including a cable drive with a front cable drive pulley having a large diameter cable groove and a small diameter cable groove mounted on the vehicle frame for rotation about an axis, a rear cable drive pulley having a large diameter cable groove and a small diameter cable groove mounted on the vehicle frame for rotation about an axis, a motor that drives the front and rear cable drive pulleys in one direction to open the sliding door and in another direction to close the sliding door, a front cable that extends from the front cable drive pulley to the sliding door, a rear cable that extends from the rear cable drive pulley to the sliding door, a fixed idler roller mounted on the vehicle frame and spaced from the rear cable drive pulley, a spring biased roller mounted on the frame between the rear cable drive pulley and the fixed idler roller and spring biased into contact with the rear cable to apply tension to the rear cable and wherein the fixed idler roller and the spring biased roller are mounted in positions which provide a cable tension when the rear cable is driven by the large diameter cable groove that is substantially equal to the cable tension when the rear cable is driven by the small diameter cable groove.

3. A sliding door opening and closing system for a vehicle including a vehicle frame; sliding door tracks attached to the vehicle frame; a sliding door supported by the sliding tracks and guided by the sliding door tracks between a closed position and a fully open position; and a closed loop cable closure system mounted on the vehicle frame and including a cable drive with a front cable drive pulley having a large diameter cable groove and small diameter cable groove mounted on the vehicle frame for rotation about an axis, a rear cable drive pulley having a large diameter cable groove and a small diameter cable groove mounted on the vehicle frame for rotation about an axis, a motor that drives the front and rear cable drive pulleys in one direction to open the sliding door and in another direction to close the sliding door, a front cable that extends from the front cable drive pulley to the sliding door and is driven by the small diameter cable groove on the front cable drive pulley when the sliding door is in the forward portion of the sliding door track and is driven by the large diameter cable groove on the front cable drive pulley when the sliding door is in the rear portion of the sliding door track, a rear cable that extends from the rear cable drive pulley to the sliding door and is driven by the small diameter cable groove on the rear cable drive pulley when the sliding door is in the forward portion of the sliding door track and is driven by the large diameter cable groove on the rear cable drive pulley when the sliding door is in the rear portion of the sliding door track, a first fixed idler roller mounted on the vehicle frame and spaced from the front cable drive pulley, a first spring biased roller mounted on the frame between the front cable drive pulley and the first fixed idler roller and spring biased into contact with the front cable and wherein the first fixed idler roller and the first spring biased roller are mounted in positions which provide a cable tension when the front cable is driven by the large diameter cable groove on the front cable drive pulley that is substantially equal to the cable tension when the front cable is driven by the small diameter cable groove on the front cable drive pulley, and a second fixed idler roller mounted on the vehicle frame and spaced from the rear cable drive pulley, a second spring biased roller mounted on the frame between the rear cable drive pulley and the second fixed idler roller and spring biased into contact with the rear cable and wherein the second fixed idler roller and the second spring biased roller are mounted in positions which provide cable tension when the rear cable is driven by the large diameter cable groove on the rear cable drive pulley that is substantially equal to the cable tension when the rear cable is driven by the small diameter cable groove on the rear cable drive pulley.

* * * * *